United States Patent [19]

Jewett

[11] 4,106,875
[45] Aug. 15, 1978

[54] EXPLOSIVELY-SEPARATED TONGUE AND GROOVE JOINT

[75] Inventor: Harvey R. Jewett, San Diego, Calif.

[73] Assignee: The United States of America as represented by the Secretary of the Navy, Washington, D.C.

[21] Appl. No.: 836,167

[22] Filed: Sep. 23, 1977

[51] Int. Cl.² .............................................. F16B 1/00
[52] U.S. Cl. ......................................... 403/2; 403/16; 403/379; 102/49.5
[58] Field of Search ....................... 403/2, 16, 11, 315, 403/354, 379; 85/DIG. 1; 29/421 E; 102/49.5, 49.4; 89/1 B, 1.5 F; 285/4

[56] References Cited

U.S. PATENT DOCUMENTS

| | | | |
|---|---|---|---|
| 3,139,031 | 6/1964 | Schroter et al. | 102/49.5 X |
| 3,230,885 | 1/1966 | Weber et al. | 403/11 |
| 3,362,290 | 1/1968 | Carr et al. | 89/1 B |
| 3,486,410 | 12/1969 | Drexelius et al. | 89/1 B |

*Primary Examiner*—Andrew V. Kundrat
*Attorney, Agent, or Firm*—Richard S. Sciascia; Paul N. Critchlow

[57] ABSTRACT

A pair of structural members are coupled by a tongue and groove joint having a groove half and a tongue half. To secure the joint, bolts extend transversely through aligned bolt holes and, on each side of the tongue half holes, are so-called 'collapsing' slots. A linear explosive is placed in the base of the groove near the inner end of the tongue. The metal thickness of the tongue lying between the explosive and its holes and slots forms a 'web' which, upon detonation, collapses into the slots. The collapse stretches the web portion adjacent the bolt holes sufficiently to produce a rupture or opening through which the bolts pass to permit separation of the structural members. The separation also is responsive to the explosive force so that the members are accelerated apart in opposite directions.

10 Claims, 9 Drawing Figures

EXPLOSIVELY-SEPARATED TONGUE AND GROOVE JOINT

BACKGROUND OF THE INVENTION

The invention relates to explosively-actuated release mechanisms and, in particular, to mechanisms for releasing and forcefully separating a pair of coupled structural members.

Explosively-actuated release devices are well-known and widely-used in a variety of differing applications. For example, hollow bolts filled with an explosive are quite well known as are other securing or clamping mechanisms which, for release purposes, are explosively severed or disintegrated in various manners. As will become apparent, such conventional mechanisms are not suitable for present purposes.

Development of the present invention primarily has been concerned with the problem of releasing and separating portions of a missile during flight. In particular, its primary use is to release and separate a protecting covering or shell, known as a shroud, of the so-called Cruise missile. This shroud is in the form of a rather large cylindrical section formed of semi-cylindrical halves which initially are securely bolted together to provide a protecting covering or skin for the tail or fin section of the missile. When air-borne, the coupling is broken and halves separate to permit the fins, which initially are collapsed, to spring into operative position.

The release of the missile halves involves some special considerations which, when understood, should serve to demonstrate the inapplicability of conventional prior art devices. One such consideration is the need not only to provide the bolt-release capability but also to achieve separation of the halves at a rather high rate of speed to assure that they are quickly thrown clear of the remaining parts of the missile. It is recognized that springs and the like have been used for this purpose. However, such mechanical devices occupy critical space and add weight to the missile. Also, in view of the size and weight of the shroud halves, the use of spring mechanisms and the like has been found to have definite limitations. A further requirement of the shroud release mechanisms is that they operate in a manner which, to the maximum degree possible, avoids contamination or damage to the remaining parts of the missile by explosively produced flying fragments or shrapnel. When, as is presently the case, a large number of bolts are needed, the resulting contamination could be quite damaging.

The present release and separation system is intended primarily to fulfill these requirements as well as others to be discussed. However, it perhaps is important to re-emphasize the fact that the use of the present system is by no means limited to the specific missile application which has been discussed. Instead, within the scope of the appended claims, the invention contemplates a wide variety of uses in which a primary need is to quickly release and forcefully separate securely-coupled structural members.

Generally considered, the invention provides a tongue and groove coupling in which a tongue half of the coupling is inserted into the groove half and tightly secured by transversely extending bolts. An explosive means, such as a linear explosive, is disposed between the members preferably in the base of the groove adjacent to the tongue. In addition to the essential bolt holes, one of the members, such as the tongue member, is provided with slots disposed near the holes, most suitably, one on each side of each of each hole. The explosive, which may be a linear explosive, operatively spans all of the slots in close proximity to both the slots and the bolt holes. When detonated, the force of the explosive drives the metal web portion above the slots into the slots causing them to collapse. The collapse, in turn, exerts sufficient tension on the web portion of the metal above the holes to produce a rupturing providing openings through which the bolts can freely pass to permit the members to separate. The force of the detonation also functions to forcefully drive the tongue and groove halves apart.

BRIEF DESCRIPTION OF THE DRAWINGS

The present invention is illustrated in the accompanying drawings of which.

DETAILED DESCRIPTION OF THE INVENTION

Figure 1:
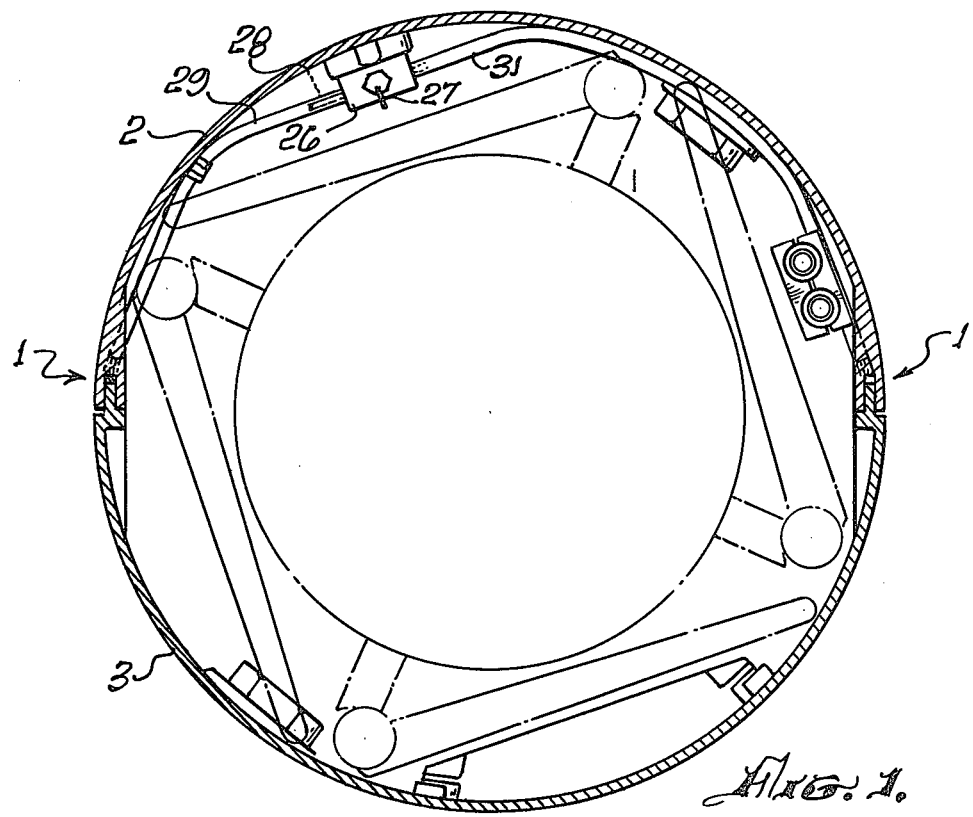
FIG. 1 is a somewhat schematic, cross-sectional view through the shroud section of the missile showing the present tongue and groove joint.

As shown in FIG. 1, the present tongue and groove joint, generally indicated by numeral 1, is used to securely couple semi-cylindrical halves 2 and 3 which together form a so-called shroud protectively covering the fin portion of a Cruise missile. The shroud covers missile fins during initial launch and, as shown, maintains the fins in their illustrated retracted or collapsed disposition. As may be known, the Cruise missile is designed to be launched from submarine and it travels initially through the water. During this travel, the fin portions are covered by the shroud. When air-borne, the shroud is ejected and the fins expand radially outwardly into operative dispositions. Removal of the shroud requires separation of shroud halves 2 and 3 at joint section 1. To provide some idea of the release and separation requirements, it can be noted that the total weight of the shroud is about 84 pounds and, dimensionally, it has a diameter of about 20 inches and a length of about 45 inches. Joint 1 extends longitudinally of the shroud and is provided on both of its sides in diametrically opposite positions. As will be described, the shroud halves are explosively released and driven radially apart. To assure clearance of the shroud halves as they are being driven apart, the shroud ejection velocity should be in the order of 25 feet/second as a minimum. The ejection travel of each half is about 15 inches.

Figure 2:
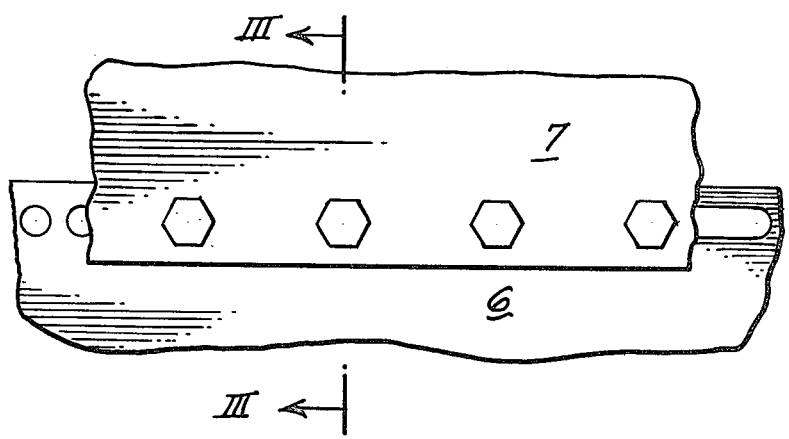
FIG. 2 is an enlarged face view of the tongue and groove coupling of FIG. 1.
Figure 3:
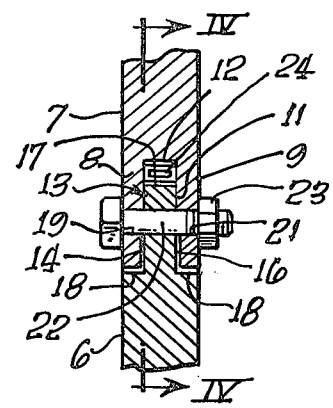
FIG. 3 is a view taken along lines 3—3 of FIG. 2.
Figure 4:
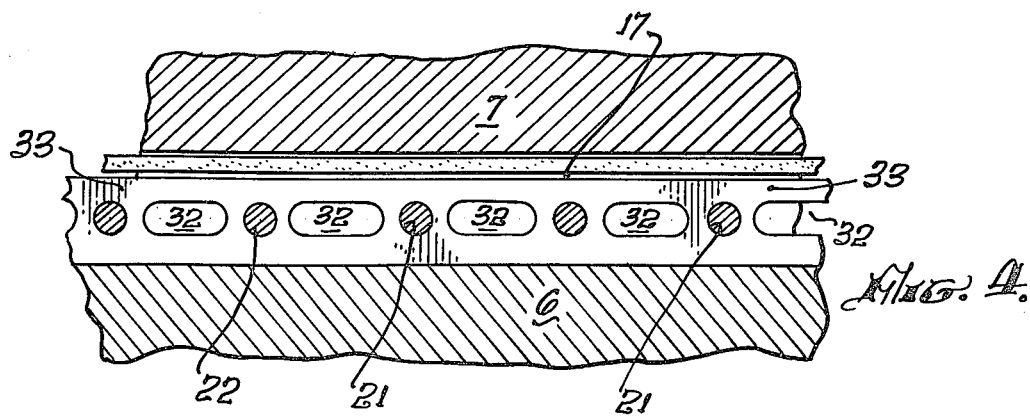
FIG. 4 is a view taken along lines 4—4 of FIG. 3.

FIGS. 2, 3 and 4 are enlarged views showing the structure of joint 1. As seen, it is a simple tongue and groove coupling formed of a tongue half 6 and a groove half 7. Obviously, as far as the present invention is concerned, the halves of the tongue and groove joint can be formed integrally with their structural members or as separate parts secured in any desired manner. Groove half 7 has spaced legs 8 and 9 forming a groove 11 having a base wall 12. Tongue half 6 includes a tongue member 13 having side walls 14 and 16 and an end wall 17. The tongue portion itself projects upwardly from laterally-extending flanges 18. To secure the connection, both halves of the joint are provided with aligned bolt holes 19 and 21 to receive bolts 22 which in the FIG. 3 modification are secured by nuts 23. Usually, there will be a plurality or series of longitudinally spaced bolts provided in sufficient number to securely hold the missiles halves tightly together.

As already indicated, the joint is adapted to be explosively separated. For this purpose, a linear explosive 24 is disposed in a spaced or cavity provided between groove base 12 and tongue end wall 17. Although the explosive may be in any desired form, it preferably is an elongate cord or strip extending the full longitudinal length of the joint. The type of explosive used principally is a matter of choice depending upon the particular job to be accomplished. It is, however, preferable to limit the force of the charge to a minimum needed to produce the release and the ejection acceleration. To detonate the explosive, upper shroud half 2 (FIG. 1) mounts a manifold 26 containing, for redundancy, a pair of initiators 28 electrically actuated by a power lead 27. Mild detonating fuses (MDE 29 and 31 couple the initiators to both ends of linear explosive 24.

One of the features of the present invention is the fact that, as shown in FIG. 4, tongue half 6 is provided with a series of elongate slots or openings 32 extending through the tongue. More particularly, a slot 32 is provided on each side of each bolt hole 21 of the tongue in longitudinal alignment with the bolt holes. For descriptive purposes, it also is to be noted that the provision of the holes and slots provides the tongue member with a web or beam portion 33 which is the metal portion of the tongue lying geometrically between its end wall 17 and the upper walls of slots 32 and holes 21. For reasons that will become apparent, this web should be relatively thin in cross-section.

Figure 5:
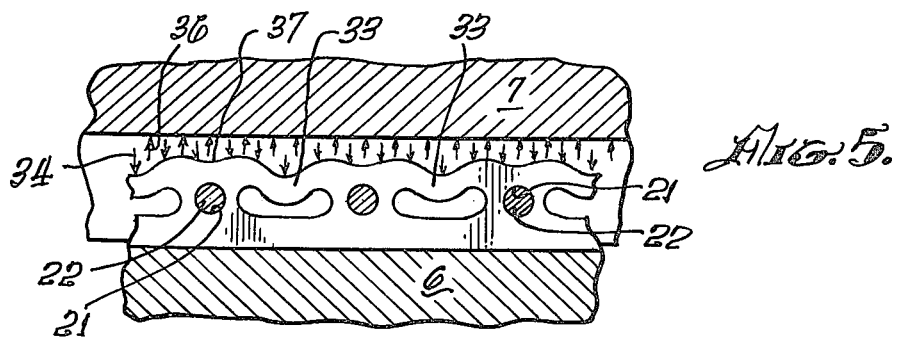
FIGS. 5, 6 and 7 are progressive operational views illustrating several separation stages of the present explosive release.
Figure 6:
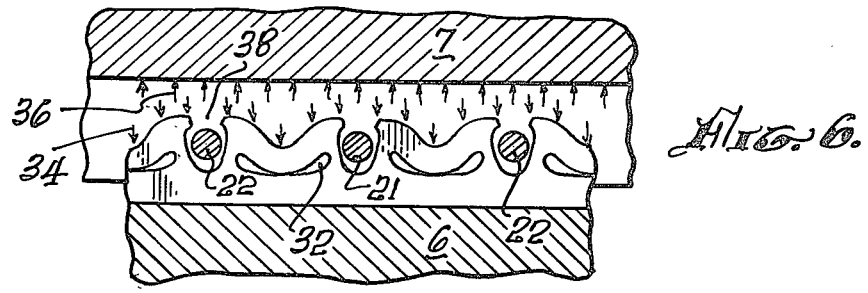
Figure 7:
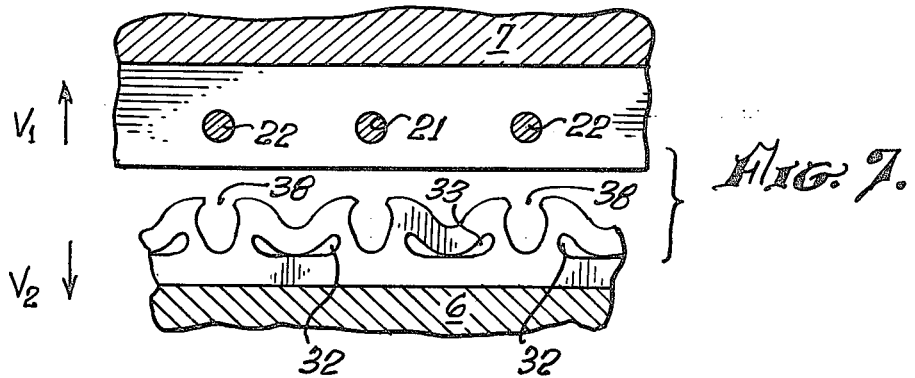

FIGS. 5, 6 and 7 illustrate operative stages of the explosive release. In FIG. 5, it is assumed that linear explosive 24 has been fired. The explosive force resulting from the detonation is represented by oppositely directed arrows 34 and 36. The first effect of the detonation is to initiate a collapse of slots 32. As seen in FIG. 5, web portion 33 is being driven or expanded into the slots to start their collapse. Because of the collapse, the web portion of the tongue lying between the bolt holes and the tongue end wall is tensioned or stretched as shown by indentations 37.

In FIG. 6, the explosive force has completely collapsed slots 32 and the tension has produced a rupturing of the web to provide openings 38 of sufficient size to permit free passage of the bolts. In FIG. 7, halves 6 and 7 of the tongue and groove joint have been driven apart by the force represented by arrows 36 and bolts 22 have passed through ruptured openings 38. Also, halves 6 and 7 are being driven apart forcefully at velocities represented by $V_1$ and $V_2$. Thus, the explosive force has the double duty of producing the rupture and of forcefully driving the halves apart at a desired velocity. As stated, in the Cruise missile application, the minimum velocity is 25 feet/second. Because the explosive charge is somewhat confined within the base wall and legs of the groove of the joint, its force is efficiently employed and, for example, a relatively low explosive charge of about 15 grains/foot is sufficient at least for the Cruise shroud application. In fact, an excess force is undesirable in that since if it is too high, it may blow off the leg portions of the groove half or, as has been found, bow the legs so that they clamp onto the tongue and resist separation. Although the preferred arrangement is to place with the linear explosive in the base of groove 11, separation also can be achieved by a reverse arrangement. For example, slots 32 can be formed in the legs of groove half 7. The explosive then would be placed between the ends of legs 14 and 16 and flanges 18 of the tongue half. Such a re-arrangement is contemplated although, as indicated, the natural charge-confining enclosure provided by the end wall of the tongue and the base and side walls of the groove is preferred.

Figure 8:
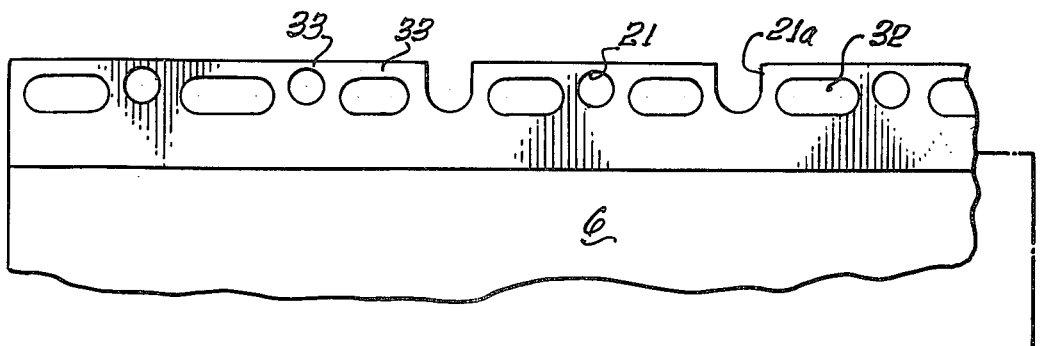
FIG. 8 is a face view of showing a modified form of the tongue half of the present coupling and FIG. 9 is an enlarged view similar to FIG. 3 showing other structural modifications.
Figure 8:
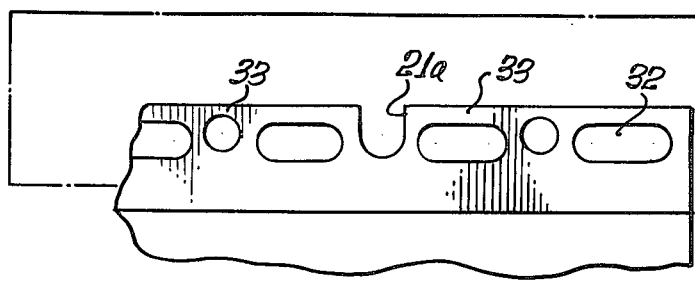
Figure 9:
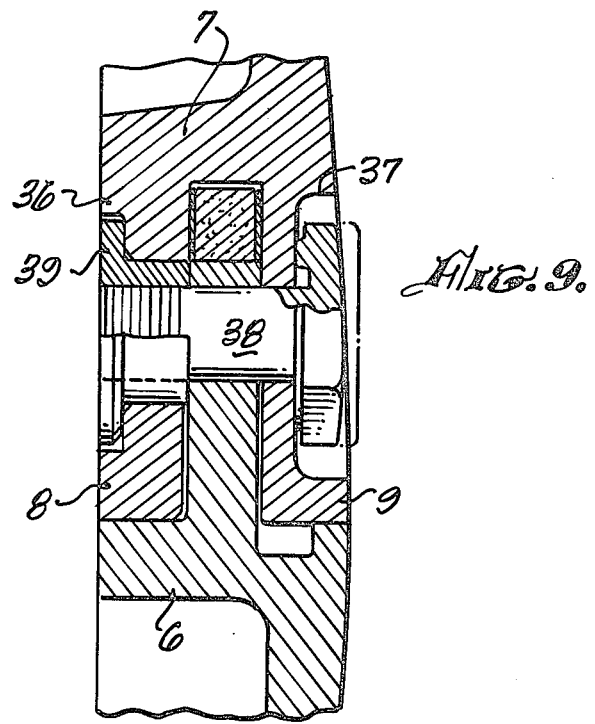

FIGS. 8 and 9 illustrate certain modifications which, in the Cruise missile application, have been found to improve reliability. First, because of the length of the tongue and groove joint, additional bolt holes are needed to provide additional retention strength. Consequently, bolt holes are added but, to minimize explosive force requirements, these holes are cut out in the illustrated manner. In other words, web or beam section 33 lying above bolt holes 21a is cut away. In this particular implementation, the width of web portion 33 is 0.100 inch. In other implementations, cut away holes 21 may not be needed although, if tests show an inability to open a passage for the holes, they may be found beneficial.

Another helpful modification is that, instead of the bolt and nut arrangement of FIG. 3, the coupling can utilize the special bolted arrangement of FIG. 9. As there is shown, legs 8 and 9 are provided with counterbores 36 and 37 to receive a special bolt 38 having a threaded portion engaged by a bushing 39. This particular arrangement strengthens the bolts and reduces possible shearing by the detonation force.

FIG. 9 illustrates a modification used to prevent the bowing problem previously mentioned. Such bowing may result because the explosive force on the upper sidewalls of legs 8 and 9 can force the lower portion of the legs into a tightly clamped engagement with the tongue. Clamping obviously is undesirable and can be avoided by shaving the inner walls of the legs. In particular, as shown in FIG. 9, the width of the legs extending from their end walls to the center line of the bolt is narrower than the width of the legs lying above the bolt. In practice, reducing the lower leg thickness by 0.30 inches provides a sufficient clearance to prevent the clamping.

The intended operation of the present joint has been discussed and, particularly in view of FIGS. 5–7, should be apparent. Its advantages lie primarily in its ability initially to securely and rigidly bind together rather large structural members and, when desired, to achieve a rapid and forceful separation of these members without producing contaminating fragmentation. Because of the arrangement, relatively low level explosive charges can be used. Obviously, the separation can be remotely controlled or timed to suit the purposes for which it is used.

Obviously many modifications and variations of the present invention are possible in the light of the above teachings. It is therefore to be understood that within the scope of the appended claims the invention may be practiced otherwise than as specifically described.

I claim:

1. Explosively separated tongue and groove coupling apparatus comprising:

a groove member having laterally spaced leg portions forming a longitudinally-extending tongue-receiving groove, a tongue member fitted into said groove, at least one laterally-extending bolt means securing said members, explosive means disposed between said members, and means for detonating said explosive means, both of said members being provided with aligned bolt-receiving holes and at least one of said members being formed with a plurality of slots disposed longitudinally of said member in close proximity to a bolt-receiving hole, said explosive means operatively spanning the length of said plurality of slots and being spaced from said slots and bolt holes by a beam-like web portion of the tongue member, detonation of said explosive means collapsing said web portion adjacent each of said slots for opening each bolt hole and said detonation further providing a force for driveably separating said members with each bolt freely passing through its opened bolt hole.

2. The apparatus of claim 1 wherein said slots are formed in said tongue member and said explosive means is disposed between the inner end of the groove and said web portion of the tongue member.

3. The apparatus of claim 2 wherein said explosive means is a linear explosive.

4. The apparatus of claim 2 wherein said tongue and groove members each are formed with a series of bolt-receiving holes and said slots are provided one on each side of each bolt hole.

5. The apparatus of claim 4 wherein said explosive means is selected to provide a low-level explosive force of a limited magnitude sufficient only to open said bolt holes and driveably separate said members at a desired rate of speed.

6. The apparatus of claim 5 wherein said limited force level is below a level capable of fragmenting portions of said coupling.

7. The apparatus of claim 4 wherein selected holes of said tongue member series initially are formed as open-faced slots through which the bolts can freely pass during separation.

8. The apparatus of claim 4 wherein:

said tongue member is a central tongue-like extension projecting into said groove from laterally-extending thickness-reducing flanges formed one on each side of said extension, the leg portions of said groove member having end walls disposed in close proximity to said lateral flanges.

9. The apparatus of claim 8 wherein the outer ends of said leg portions of the groove member are spaced apart to provide a small clearance for said fitted tongue-like extension, said clearance being sufficient to avoid binding of said extension by said leg portions when said explosive means is detonated.

10. The apparatus of claim 9 wherein said bolt means are threaded members provided with thread-reinforcing bushings.

* * * * *